United States Patent
Ma et al.

(10) Patent No.: US 11,145,901 B2
(45) Date of Patent: Oct. 12, 2021

(54) ELECTROLYTE AND ELECTROCHEMICAL DEVICE

(71) Applicant: NINGDE AMPEREX TECHNOLOGY LIMITED, Ningde (CN)

(72) Inventors: Juan Ma, Ningde (CN); Shuirong Zhang, Ningde (CN); Junfei Liu, Ningde (CN); Chao Tang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 0 days.

(21) Appl. No.: 16/406,943

(22) Filed: May 8, 2019

(65) Prior Publication Data

US 2020/0161702 A1  May 21, 2020

(30) Foreign Application Priority Data

Nov. 20, 2018 (CN) .......................... 201811381488.1

(51) Int. Cl.
*H01M 10/0567* (2010.01)
*H01M 10/0525* (2010.01)
*H01M 10/0568* (2010.01)
*H01M 10/0569* (2010.01)

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0025* (2013.01)

(58) Field of Classification Search
CPC ......... H01M 10/0525; H01M 10/0567; H01M 10/0568; H01M 10/0569; H01M 2004/021; H01M 2220/30; H01M 2300/0025; Y02E 60/10
See application file for complete search history.

(56) References Cited

U.S. PATENT DOCUMENTS

| 6,156,459 | A | 12/2000 | Negoro et al. | |
|---|---|---|---|---|
| 2015/0188192 | A1* | 7/2015 | Fujii | H01M 4/505 429/338 |
| 2018/0269528 | A1* | 9/2018 | Zhang | H01M 4/505 |
| 2019/0267672 | A1* | 8/2019 | Hiasa | H01M 10/0525 |

FOREIGN PATENT DOCUMENTS

| CN | 102709588 | A | * | 10/2012 | ........ H01M 10/0525 |
|---|---|---|---|---|---|
| CN | 103943883 | A | | 7/2014 | |
| CN | 104752769 | A | | 7/2015 | |
| CN | 104852087 | A | | 8/2015 | |
| CN | 105406121 | A | | 3/2016 | |
| CN | 105958110 | A | * | 9/2016 | ........ H01M 10/0525 |
| CN | 107275675 | A | | 10/2017 | |
| CN | 108172894 | A | | 6/2018 | |
| CN | 108475814 | A | | 8/2018 | |
| JP | 2008004557 | A | | 1/2008 | |
| JP | 2014192111 | A | | 10/2014 | |

OTHER PUBLICATIONS

Machine Translation CN 102709588(A) (Year: 2012).*
Machine Translation CN 104852087(A) (Year: 2015).*
Machine Translation CN 105958110(A) (Year: 2016).*
Chinese Office Action and Search Report dated Feb. 3, 2020, in counterpart Chinese application 201811381488.1, 8 pages in Chinese.
Chinese Second Office Action and Search Report dated Jun. 15, 2020, in counterpart Chinese application 201811381488.1, 8 pages in Chinese.

* cited by examiner

*Primary Examiner* — Victoria H Lynch
(74) *Attorney, Agent, or Firm* — Juan Carlos A. Marquez; Marquez IP Law Office, PLLC

(57) ABSTRACT

The present application relates to an electrolyte and an electrochemical device. The electrolyte includes an organic solvent, an additive and a lithium salt, the additive including a cyclic borate and a nitrile compound. The electrolyte of the present application has good stability at a high working voltage. In another embodiment of the present application, the combination of the electrolyte and an anode having a high compacted density provides a high energy density for the electrochemical device, and improves the storage, floating charge and dynamicperformance of the electrochemical device.

14 Claims, No Drawings

ELECTROLYTE AND ELECTROCHEMICAL DEVICE

CROSS REFERENCE TO RELATED APPLICATIONS

The present application claims the benefit of priority from China Patent Application No. 201811381488.1, filed on 20 Nov. 2018, the disclosure of which is incorporated herein by reference in its entirety.

BACKGROUND

1. Technical Field

The present application relates to the field of energy storage, and in particular to an electrochemical device, particularly a lithium-ion battery.

2. Description of the Related Art

With the widespread use of electronic devices such as cameras, digital video cameras, mobile phones and notebook computers, people have increasingly high performance requirements for electrochemical devices (e.g., lithium-ion batteries). Lithium-ion batteries have been widely used in various fields due to their high energy density, long cycle life, no memory effect, etc. At present, reducing the volume of lithium-ion batteries and reducing their weight (i.e., increasing the energy density of lithium-ion batteries) is one of the directions for improving lithium-ion batteries. The working voltage of the traditional lithium-ion battery is typically below 4.35 V. When the conventional lithium-ion battery is at a high working voltage of 4.35 V or higher, the electrolyte is easily oxidized and decomposed, resulting in an increase in the impedance of the cathode and rapid consumption of the electrolyte, thereby deteriorating the performance of the lithium-ion battery, such as floating charge, cycling and bulging.

In view of this, it is indeed necessary to provide an improved electrochemical device.

SUMMARY

The present application is directed to an electrochemical device having a high energy density and requires the electrochemical device to have excellent storage, floating charge and dynamic performance.

The embodiments of the present application solve at least one of the problems existing in the related art at least to some extent by providing an electrolyte and an electrochemical device and an electronic device using the electrolyte.

In one embodiment, the present application provides an electrolyte, wherein the electrolyte includes an organic solvent, an additive and a lithium salt, the additive including a cyclic borate and a nitrile compound.

According to the embodiment of the present application, the cyclic borate has the following structure:

wherein $R_1$ is an alkyl group having 1-18 carbon atoms, a cycloalkyl group having 6-18 carbon atoms, an alkoxy group having 1-18 carbon atoms, a cyclic alkoxy group having 3-18 carbon atoms, a borate alkyl group having 3-12 carbon atoms or a cyclic borate alkyl group having 3-12 carbon atoms.

According to the embodiment of the present application, the cyclic borate is at least one selected from the group consisting of:

Organic Substance 1

Organic Substance 2

Organic Substance 3

Organic Substance 4

Organic Substance 5

Organic Substance 6

Organic Substance 7

Organic Substance 8

Organic Substance 9

Organic Substance 10

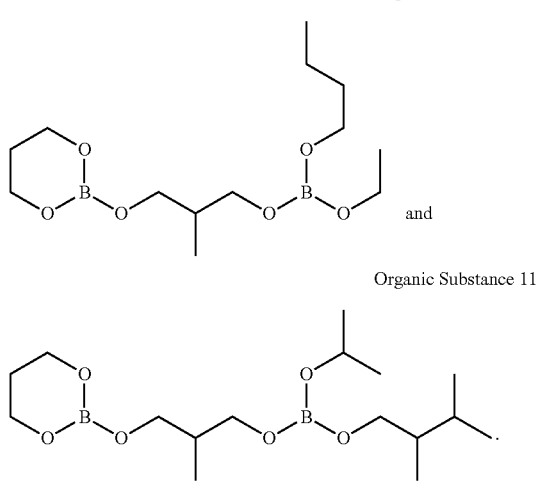

and

Organic Substance 11

According to the embodiment of the present application, based on the total weight of the electrolyte, the content of the nitrile compound is about 0.05% to about 6%, and the content of the cyclic borate is about 0.01% to about 3%.

According to the embodiment of the present application, the nitrile compound has the following structure:

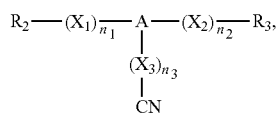

wherein:

A is selected from a chain alkyl group having 1-6 carbon atoms, a cycloalkyl group having 3-12 carbon atoms, an alkylene group having 2-6 carbon atoms or a cyclic alkylene group having 6-12 carbon atoms;

$R_2$ and $R_3$ are each independently selected from a hydrogen atom, a cyano group, a nitrile group having 1-5 carbon atoms or an alkyl group having 1-8 carbon atoms;

$X_1$, $X_2$ and $X_3$ are each independently selected from —$CH_2$—, —O—, —$OCH_2$—, —$OCH_2CH_2CH_2$—, —$OCH_2CH_2$—, —CHF— or —$CF_2$—; and $n_1$, $n_2$ and $n_3$ are each independently an integer selected from 0-10.

According to the embodiment of the present application, the nitrile compound is at least one selected from the group consisting of:

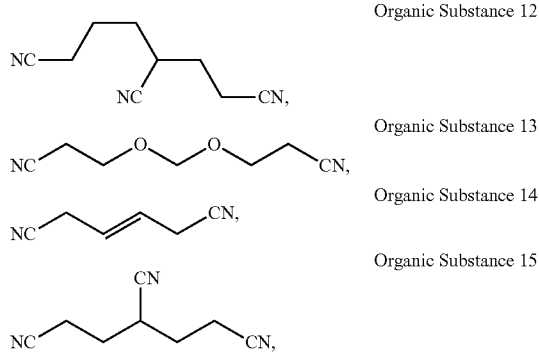

Organic Substance 12

Organic Substance 13

Organic Substance 14

Organic Substance 15

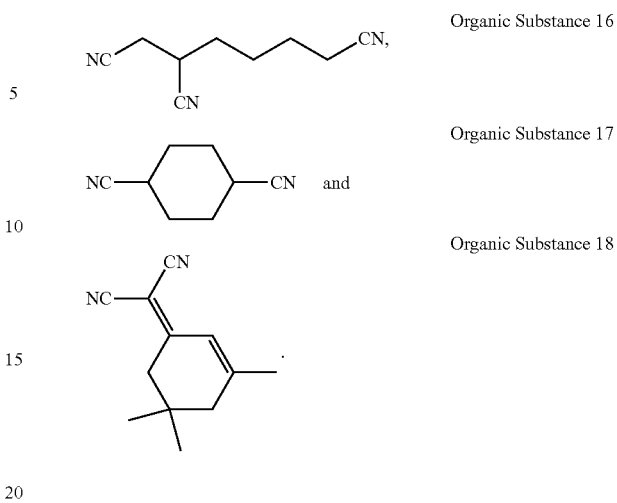

Organic Substance 16

Organic Substance 17 and

Organic Substance 18

According to the embodiment of the present application, the organic solvent includes a carboxylate having the following structure:

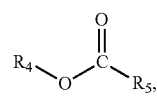

wherein $R_4$ and $R_5$ are each independently an alkyl group having 1-5 carbon atoms.

According to the embodiment of the present application, based on the total weight of the electrolyte, the additive further includes a fluorosulfonate, the content of the fluorosulfonate being about 0.01% to about 5%.

According to the embodiment of the present application, the fluorosulfonate has the following structure:

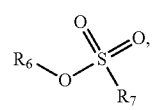

wherein:

$R_6$ and $R_7$ are each independently selected from an alkyl group having 2-20 carbon atoms, a fluoroalkyl group having 2-20 carbon atoms, an alkoxy group having 2-10 carbon atoms, a fluoroalkoxy group having 2-10 carbon atoms, an alkenyl group having 2-20 carbon atoms or a fluoroalkenyl group having 2-20 carbon atoms.

According to the embodiment of the present application, the fluorosulfonate is at least one selected from the group consisting of:

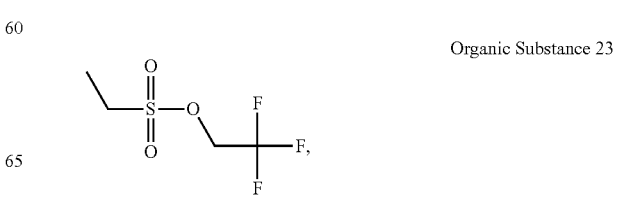

Organic Substance 23

Organic Substance 24
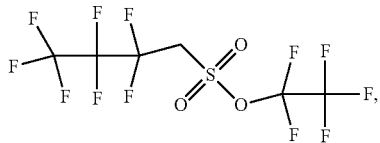

Organic Substance 25
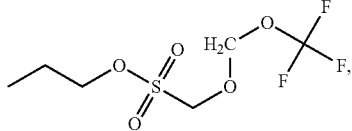

Organic Substance 26
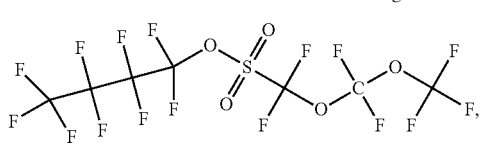

Organic Substance 27
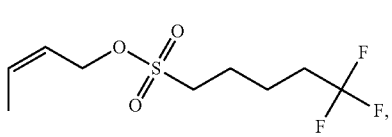

Organic Substance 28
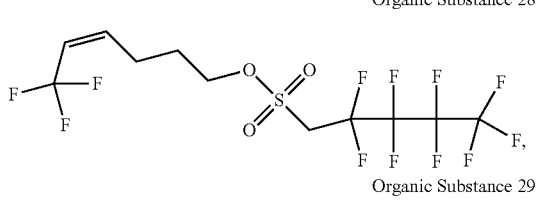

Organic Substance 29
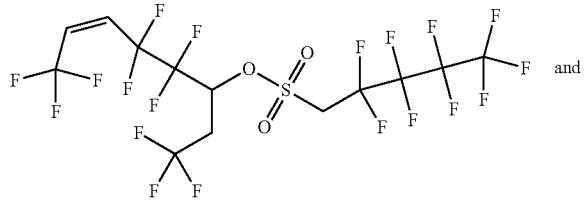

and

Organic Substance 30
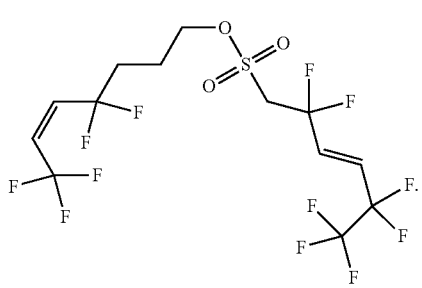

.

According to the embodiment of the present application, the additive further includes at least one other film-forming additive selected from the group consisting of fluoroethylene carbonate, vinylene carbonate, 1,3-propane sultone, 1,3,2-Dioxathiolane 2,2-dioxide, methylene methanedisulfonate and lithium bis(oxalate)borate.

In another embodiment, the present application provides an electrochemical device, including: a cathode; an anode; a separator; and an electrolyte, wherein the anode has a compacted density of not less than about 1.75 g/cm$^3$, and wherein the electrolyte includes the electrolyte of the embodiments of the present application.

In another embodiment, the present application provides an electronic device, including the electrochemical device of the embodiments of the present application.

The additional aspects and advantages of the embodiments of the present application will be described and illustrated in part in the description which follows, or explained by way of the examples of the present application.

DETAILED DESCRIPTION

The embodiments of the present application will be described in detail below. The embodiments of the present application should not be interpreted as limitations to the present application.

As used herein, the term "about" is used to describe and explain minor changes. When used in conjunction with an event or situation, the term may refer to examples where the event or situation occurs exactly and examples where the event or situation occurs very closely. For example, when used in conjunction with a numerical value, the term may refer to a variation range that is less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios, and other numerical values are sometimes presented herein in a range format. It should be understood that such range formats are for convenience and brevity, and should be interpreted with flexibility, and include not only those numerical values that are specifically designated as range limitations, but also include all individual numerical values or sub-ranges that are within the range, as each value and sub-range is specified explicitly.

As used herein, the content of each component is a mass percentage based on the total weight of the electrolyte.

I. Electrolyte

In one embodiment, the present application provides an electrolyte including an organic solvent, an additive and a lithium salt as described below.

At high working voltages, the chemical stability of conventional electrolytes deteriorates, the impedance of the cathode interface increases, and the electrolyte is quickly consumed, thereby deteriorating the performance of the battery such as floating charge, storage, etc.

The electrolyte of the present application is applicable to an electrochemical device with high working voltages. The use of the electrolyte of the present application allows the electrochemical device to achieve a rate performance of about 80% or greater.

1. Additive

In some embodiments, the additive includes a cyclic borate and a nitrile compound. In some embodiments, the additive may further include a fluorosulfonate. In some embodiments, the additive may further include other film-forming additives.

Cyclic Borate

In some embodiments, the cyclic borate has the following structure:

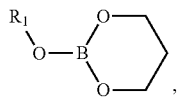

wherein $R_1$ is an alkyl group having 1-18 carbon atoms, a cycloalkyl group having 6-18 carbon atoms, an alkoxy group having 1-18 carbon atoms, a cyclic alkoxy group having 3-18 carbon atoms, a borate alkyl group having 3-12 carbon atoms or a cyclic borate alkyl group having 3-12 carbon atoms.

In some embodiments, the cyclic borate includes, but is not limited to, the following compounds:

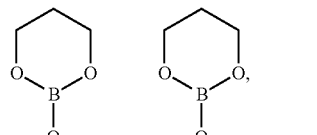

Organic Substance 1

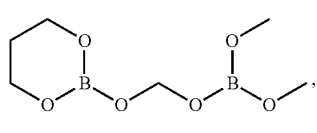

Organic Substance 2

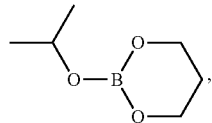

Organic Substance 3

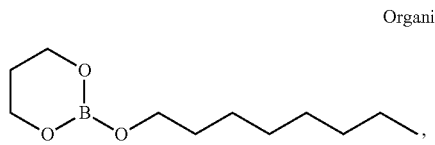

Organic Substance 4

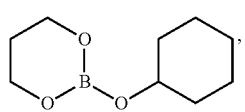

Organic Substance 5

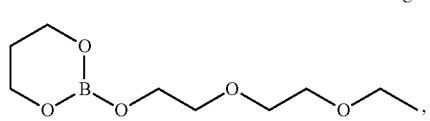

Organic Substance 6

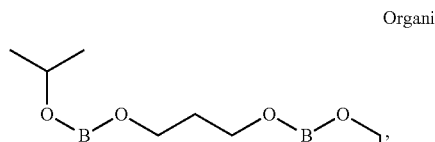

Organic Substance 7

Organic Substance 8

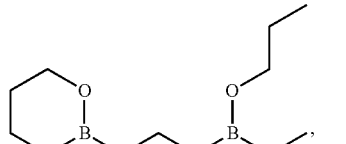

Organic Substance 9

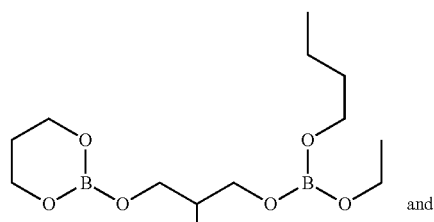

Organic Substance 10 and

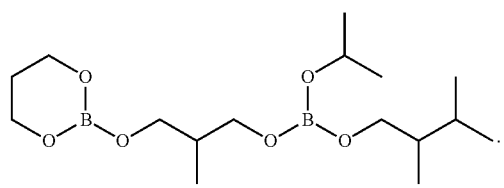

Organic Substance 11

When the content of the cyclic borate in the electrolyte of the present application is low, it cannot effectively cover the deficient site of the cathode material, cannot sufficiently complex the free anion of the lithium salt, and cannot effectively suppress the interface side reaction and lithium salt induced side reactions. When the content of the cyclic borate in the electrolyte of the present application is high, the cyclic borate may form a thick protective film on the surface of the cathode material, which is not beneficial to the passage of ions in the electrochemical device (e.g., lithium ions in the lithium-ion battery), and thus results in the increased transfer impedance of the ions and a decrease in the rate performance of the ions.

In some embodiments, the content of the cyclic borate is about 0.01% to about 3%. In some embodiments, the content of the cyclic borate is about 0.5% to about 2%. In some embodiments, the content of the cyclic borate is about 0.5% to about 1%.

Nitrile Compound

When the electrolyte of the present application includes the cyclic borate and the nitrile compound, the oxygen vacancy and the transition metal on the surface of the cathode can be simultaneously stabilized, thereby significantly reducing the oxidizing effect of the surface of the cathode of the electrochemical device in a charged state on the electrolyte, and improving the floating charge and storage performance of the electrochemical device.

In some embodiments, the nitrile compound has the following structure:

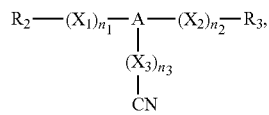

wherein:

A is selected from a chain alkyl group having 1-6 carbon atoms, a cycloalkyl group having 3-12 carbon atoms, an alkylene group having 2-6 carbon atoms or a cyclic alkylene group having 6-12 carbon atoms;

$R_2$ and $R_3$ are each independently selected from a hydrogen atom, a cyano group, a nitrile group having 1-5 carbon atoms or an alkyl group having 1-8 carbon atoms;

$X_1$, $X_2$ and $X_3$ are each independently selected from —$CH_2$—, —O—, —$OCH_2$—, —$OCH_2CH_2CH_2$—, —$OCH_2CH_2$—, —CHF— or —$CF_2$—; and $n_1$, $n_2$ and $n_3$ are each independently an integer selected from 0-10.

In some embodiments, the nitrile compound includes, but is not limited to, the following compounds:

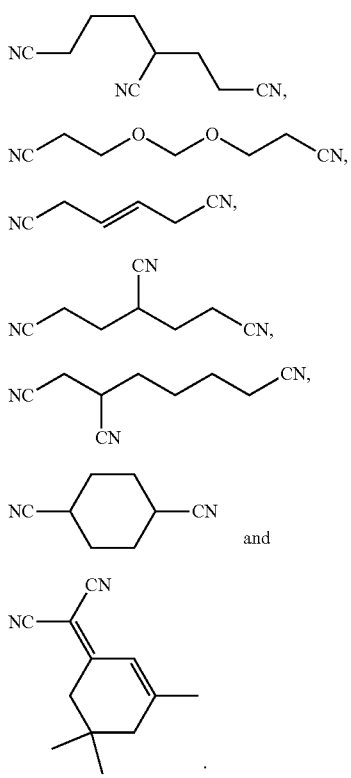

Organic Substance 12
Organic Substance 13
Organic Substance 14
Organic Substance 15
Organic Substance 16
Organic Substance 17
and
Organic Substance 18

When the content of the nitrile compound in the electrolyte of the present application is low, it cannot effectively cover the active site on the surface of the cathode. When the content of the nitrile compound in the electrolyte of the present application is high, it causes an increase in the viscosity of the electrolyte, thereby affecting the dynamicperformance of the electrochemical device.

In some embodiments, the content of the nitrile compound is about 0.05% to about 6%. In some embodiments, the content of the nitrile compound is about 0.05% to about 4%. In some embodiments, the content of the nitrile compound is about 0.5% to about 2%.

Fluorosulfonate

The fluorosulfonate has high surface activity, high thermal stability and chemical stability. A small amount of fluorosulfonate can significantly reduce the surface tension of the solution.

As described above, when the electrolyte of the present application includes the cyclic borate and the nitrile compound, the oxygen vacancy and transition metal on the surface of the cathode can be simultaneously stabilized, and the floating charge and storage performance of the electrochemical device can be improved.

Further addition of the fluorosulfonate to the electrolyte of the present application can reduce the effect of the addition of the cyclic borate and the nitrile compound on the increase in impedance of the electrolyte. In particular, when the electrochemical device includes an anode having a high compacted density, the fluorosulfonate can effectively improve the dynamic performance of the electrochemical device, thereby providing the electrochemical device with good 2C charging performance.

In some embodiments, the fluorosulfonate has the following structure:

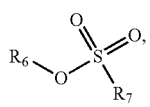

wherein:

$R_6$ and $R_7$ are each independently selected from an alkyl group having 2-20 carbon atoms, a fluoroalkyl group having 2-20 carbon atoms, an alkoxy group having 2-10 carbon atoms, a fluoroalkoxy group having 2-10 carbon atoms, an alkenyl group having 2-20 carbon atoms or a fluoroalkenyl group having 2-20 carbon atoms.

In some embodiments, the fluorosulfonate has at least 3 fluorine atoms.

In some embodiments, the fluorosulfonate includes, but is not limited to, the following compounds:

Organic Substance 23

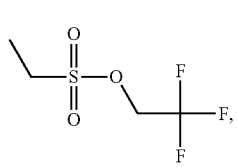

Organic Substance 24

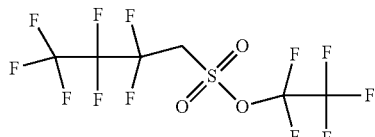

Organic Substance 25

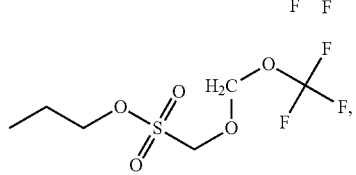

Organic Substance 26

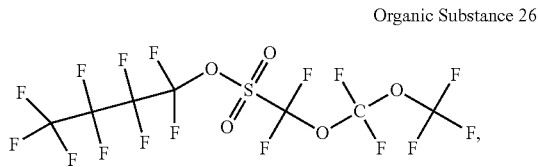

Organic Substance 27

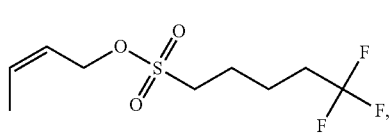

Organic Substance 28

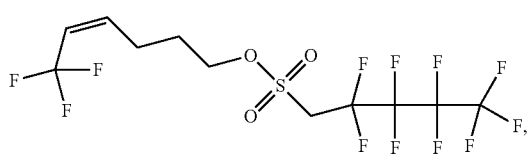

-continued

Organic Substance 29

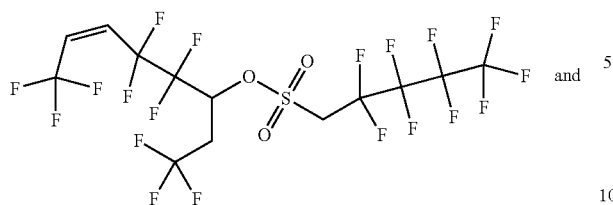 and

Organic Substance 30

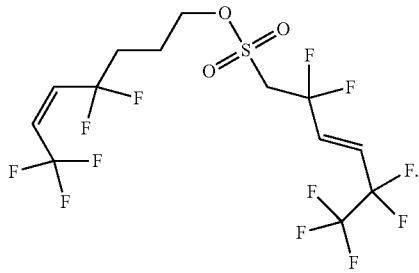

When the content of the fluorosulfonate in the electrolyte of the present application is low, the dynamic performance of the electrochemical device cannot be remarkably improved. When the content of the fluorosulfonate in the electrolyte of the present application is high, it may form a thick wetting film layer on the surface of the anode. Since the molecules of the fluorosulfonate are large, the thick wetting layer may affect the rapid migration of ions in the electrochemical device (e.g., lithium ions of the lithium-ion battery), thereby affecting the rate performance of the electrochemical device.

In some embodiments, the content of the fluorosulfonate is about 0.01% to about 5%. In some embodiments, the content of the fluorosulfonate is about 0.1% to about 3%. In some embodiments, the content of the fluorosulfonate is about 0.1% to about 1%.

Other Film-Forming Additives

In some embodiments, other film-forming additives include, but are not limited to, at least one of fluoroethylene carbonate (FEC), vinylene carbonate (VC), 1,3-propane sultone (PS), 1,3,2-Dioxathiolane 2,2-dioxide (DTD), methylene methanedisulfonate (MMDS) and lithium bis(oxalate) borate (LiBOB). FEC, VC, PS, DTD and MMDS can be used as functional additives, which have excellent film-forming properties for the anodes. LiBOB has good thermal stability, can participate in the film-formation process for the cathode and anode, and can improve the high-temperature performance of the battery.

2. Solvent

Carbonate

In some embodiments, the carbonate includes, but is not limited to, specifically, one or more of ethylene carbonate (EC), propylene carbonate (PC), dimethyl carbonate (DMC), diethyl carbonate (DEC), ethyl methyl carbonate (EMC) and γ-butyrolactone (BL).

Carboxylate

Further addition of the carboxylate to the electrolyte of the present application can reduce the effect of the cyclic borate and the nitrile compound on the electrical conductivity of the electrolyte, thereby affecting the dynamic performance of the electrochemical device.

In some embodiments, the carboxylate has the following structure:

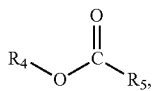

wherein $R_4$ and $R_5$ are each independently an alkyl group having 1-5 carbon atoms.

In some embodiments, the carboxylate includes, but is not limited to, the following compounds:

Organic Substance 19

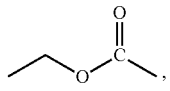

Organic Substance 20

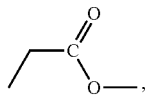

Organic Substance 21

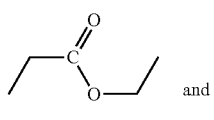 and

Organic Substance 22

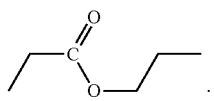.

When the content of the carboxylate in the electrolyte of the present application is low, it cannot effectively improve the electrical conductivity of the electrolyte, and thus cannot effectively improve the dynamic performance of the electrochemical device. When the content of the carboxylate in the electrolyte of the present application is high, the side reaction increases, resulting in deterioration of the storage performance of the electrochemical device.

In some embodiments, the content of the carboxylate is about 5% to about 40%. In some embodiments, the content of the carboxylate is about 10% to about 30%.

3. Lithium Salt

In some embodiments, the lithium salt is selected from one or more of an inorganic lithium salt and an organic lithium salt.

In some embodiments, the lithium salt includes, but is not limited to, at least one of lithium hexafluorophosphate ($LiPF_6$), lithium tetrafluoroborate ($LiBF_4$), lithium hexafluoroarsenate ($LiAsF_6$), lithium perchlorate ($LiClO_4$), lithium difluorophosphate ($LiPO_2F_2$), lithium bis(fluorosulfonyl)imide (LiFSI) and lithium bis(trifluoromethanesulfonyl)imide (LiTFSI).

In some embodiments, the lithium salt is lithium hexafluorophosphate ($LiPF_6$).

In some embodiments, the content of the lithium salt is about 0.5 M to about 1.5 M. In some embodiments, the content of the lithium salt is about 0.8 M to about 1.2 M.

In some embodiments, the electrolyte includes a cyclic borate, a nitrile compound, a fluorosulfonate and a carboxylate. The combination of the cyclic borate, the nitrile compound, the fluorosulfonate and the carboxylate can significantly improve the floating charge and storage performance of the electrochemical device having a high energy density, and can simultaneously improve the dynamic performance (e.g., 2C rate performance) of the electrochemical device.

II. Electrochemical Device

The electrochemical device of the present application includes any device that generates an electrochemical reaction, and its specific examples include all kinds of primary batteries, secondary batteries, fuel cells, solar cells, or capacitors. In particular, the electrochemical device is a lithium secondary battery, including a lithium metal secondary battery, a lithium-ion secondary battery, a lithium-ion polymer secondary battery. In some embodiments, the electrochemical device of the present application includes a cathode having a cathode active material capable of occluding and releasing metal ions; an anode having an anode active material capable of occluding and releasing metal ions; a separator; and the electrolyte of the present application.

In some embodiments, the working voltage of the electrochemical device is greater than 4.4 V.

1. Cathode

The cathode includes a cathode active material layer and a cathode current collector, the surface of the cathode current collector may be provided with an inorganic layer, and the cathode active material layer includes a cathode active material capable of absorbing and releasing lithium (Li) (hereinafter, sometimes referred to as "cathode active material capable of absorbing/releasing lithium (Li)"). Examples of the cathode active material capable of absorbing/releasing lithium (Li) may include lithium cobaltate, lithium nickel cobalt manganese oxide, lithium nickel cobalt aluminum oxide, lithium manganate, lithium manganese iron phosphate, lithium vanadium phosphate, oxylithium vanadium phosphate, lithium iron phosphate, lithium titanate and lithium-rich manganese-based material.

Specifically, the chemical formula of the lithium cobaltate may be shown by chemical formula 1:

  Chemical Formula 1 wherein M1 is at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), fluorine (F) and silicon (Si), and the values of x, a, b and c are respectively in the following ranges: $0.8 \leq x \leq 1.2$, $0.8 \leq a \leq 1$, $0 \leq b \leq 0.2$ and $-0.1 \leq c \leq 0.2$;

the chemical formula of the lithium nickel cobalt manganese oxide or lithium nickel cobalt aluminum oxide may be shown by chemical formula 2:

  Chemical Formula 2 wherein M2 is at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), fluorine (F) and silicon (Si), and the values of y, d, e and f are respectively in the following ranges: $0.8 \leq y \leq 1.2$, $0.3 \leq d \leq 0.98$, $0.02 \leq e \leq 0.7$ and $-0.1 \leq f \leq 0.2$;

the chemical formula of the lithium manganate may be shown by chemical formula 3:

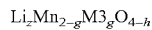  Chemical Formula 3 wherein M3 is at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and the values of z, g and h are respectively in the following ranges: $0.8 \leq z \leq 1.2$, $0 \leq g \leq 1.0$ and $-0.2 \leq h \leq 0.2$.

The cathode active material layer further includes a binder, and optionally further includes a conductive material. The binder improves the binding of the cathode active material particles to each other, and also improves the binding of the cathode active material to the current collector. Non-limiting examples of the binder include polyvinyl alcohol, hydroxypropyl cellulose, diacetyl cellulose, polyvinyl chloride, carboxylated polyvinyl chloride, polyvinyl fluoride, ethylene-oxide-containing polymers, polyvinylpyrrolidone, polyurethane, polytetrafluoroethylene, poly(1,1-difluoroethylene), polyethylene, polypropylene, styrene butadiene rubber, acrylated styrene butadiene rubber, epoxy resin, nylon, and the like.

The cathode active material layer includes a conductive material to impart conductivity to the electrode. The conductive material may include any conductive material as long as it does not cause a chemical change. Non-limiting examples of the conductive material include carbon-based materials (e.g., natural graphite, artificial graphite, carbon black, acetylene black, Ketjen black, carbon fibers, etc.), metal-based materials (e.g., metal powder, metal fibers, etc., including, for example, copper, nickel, aluminum, silver, etc.), conductive polymers (e.g., polyphenylene derivatives), and mixtures thereof.

The current collector may be aluminum (Al), but is not limited thereto.

2. Anode

The anode includes an anode active material layer and an anode current collector, the surface of the anode current collector may be provided with an inorganic layer, and the anode active material layer includes a anode active material capable of absorbing and releasing lithium (Li) (hereinafter, sometimes referred to as "anode active material capable of absorbing/releasing lithium (Li)"). Examples of the anode active material capable of absorbing/releasing lithium (Li) may include carbon materials, silicon materials, metal compounds, oxides, sulfides, nitrides of lithium such as $LiN_3$, lithium metal, metals forming alloys together with lithium, and polymer materials.

In the anode active material capable of absorbing/releasing lithium (Li), examples of the carbon material may include low graphitized carbon, easily graphitizable carbon, artificial graphite, natural graphite, mesophase carbon microspheres, soft carbon, hard carbon, pyrolytic carbon, coke, vitreous carbon, organic polymer compound sintered bodies, carbon fibers and activated carbon, wherein the coke may include pitch coke, needle coke and petroleum coke. The organic polymer compound sintered body refers to a material obtained by calcining a polymer material such as a phenol plastic or a furan resin at a suitable temperature to carbonize it. Examples of the polymer material may include polyacetylene and polypyrrole.

Examples of the silicon material may include one or more of silicon, a silicon oxygen compound, a silicon carbon compound, a silicon nitride compound and a silicon alloy. In the silicon alloy, the alloy element is at least one selected from the group consisting of Fe, Co, Sb, Bi, Pb, Ni, Cu, Zn, Ge, In, Sn and Ti.

The anode active material capable of absorbing/releasing lithium (Li) may include elemental lithium metal, metal elements and semimetal elements capable of forming alloys together with lithium (Li), alloys and compounds including such elements, and the like. When the anode includes the lithium metal, for example, when an anode active material layer is formed from a conductive skeleton having a spherical hinge shape and metal particles dispersed in the conductive skeleton, the conductive skeleton having a spherical hinge shape may have the porosity of about 5% to about 85%, and a protective layer may also be arranged on the lithium metal anode active material layer.

The anode active material layer may include a binder. The binder improves the binding of the anode active material particles to each other, and the binding of the anode active material to the current collector. Non-limiting examples of the binder include polyvinyl alcohol, carboxymethyl cellulose, hydroxypropyl cellulose, diacetyl cellulose, polyvinyl chloride, carboxylated polyvinyl chloride, polyvinyl fluoride, ethylene-oxide-containing polymers, polyvinylpyrrolidone, polyurethane, polytetrafluoroethylene, poly(1,1-difluoroethylene), polyethylene, polypropylene, styrene butadiene rubber, acrylated styrene butadiene rubber, epoxy resin, nylon, and the like.

The anode active material layer optionally further includes a conductive material to impart conductivity to the electrode. The conductive material may include any conductive material as long as it does not cause a chemical change. Non-limiting examples of the conductive material include carbon-based materials (e.g., natural graphite, artificial graphite, carbon black, acetylene black, Ketjen black, carbon fibers, etc.), metal-based materials (e.g., metal powder, metal fibers, etc., including, for example, copper, nickel, aluminum, silver, etc.), conductive polymers (e.g., polyphenylene derivatives), and mixtures thereof.

The current collector may be selected from the group consisting of copper foil, nickel foil, stainless steel foil, titanium foil, nickel foam, copper foam, a polymer substrate coated with a conductive metal, and combinations thereof.

The applicant has found that when the compacted density of the anode is low, the rate performance of the electrochemical device is greatly improved, but the energy density of the electrochemical device is decreased to some extent. When the compacted density of the anode is high, the dynamic performance of the electrochemical device is deteriorated, the internal polarization is increased, the rate performance is decreased, and meanwhile, the anode is more likely to precipitate lithium and cause the floating charge life to decrease.

In some embodiments, the anode has a compacted density of not less than about 1.75 g/cm$^3$. In some embodiments, the anode has a compacted density of not greater than about 1.85 g/cm$^3$. In some embodiments, the anode has a compacted density of not less than about 1.75 g/cm$^3$ and not greater than about 1.85 g/cm$^3$.

The combination of the electrolyte and the anode having a high compacted density of the present application can provide a high energy density for the electrochemical device, and improve the storage and floating charge performance of the electrochemical device as well as the dynamic performance of the electrochemical device.

3. Separator

The electrochemical device of the present application is provided with a separator between the cathode and the anode to prevent short circuit. The material and shape of the separator used in the electrochemical device of the present application are not particularly limited, and may be any of the techniques disclosed in the prior art. The separator includes a polymer or an inorganic substance or the like formed of a material which is stable with the electrolyte of the present application.

For example, the separator may include a substrate layer and a surface treatment layer. The substrate layer is a nonwoven fabric, a film or a composite film having a porous structure, and the material of the substrate layer is at least one selected from the group consisting of polyethylene, polypropylene, polyethylene terephthalate and polyimide. Specifically, a polypropylene porous film, a polyethylene porous film, a polypropylene nonwoven fabric, a polyethylene nonwoven fabric or a polypropylene-polyethylene-polypropylene porous composite film may be used.

At least one surface of the substrate layer is provided with the surface treatment layer, and the surface treatment layer may be a polymer layer or an inorganic substance layer, or may be a layer formed by mixing a polymer and an inorganic substance.

The inorganic substance layer includes inorganic particles and a binder, and the inorganic particles are one or a combination selected from the group consisting of aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide and barium sulfate. The binder is one or a combination selected from the group consisting of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene and polyhexafluoropropylene.

The polymer layer includes a polymer, and the material of the polymer is at least one selected from the group consisting of polyamide, polyacrylonitrile, acrylate polymer, polyacrylic acid, polyacrylate, polyvinylpyrrolidone, polyvinyl ether, polyvinylidene fluoride and poly(vinylidene fluoride-hexafluoropropylene).

III. Electronic Device

In some embodiments, the present application provides an electronic device, including the electrochemical device as described above. The electronic device of the present application includes any electronic device that can include the electrochemical device of the present application.

Hereinafter, a lithium-ion battery is taken as an example and specific embodiments are used to describe the preparation of the lithium-ion battery. Those skilled in the art will appreciate that the preparation methods described in the present application are merely examples, and any other suitable preparation method is within the scope of the present application.

Examples

The performance evaluation of the examples of the lithium-ion battery according to the present application and comparative examples is explained below.

1. Preparation of Lithium-Ion Battery (1) Preparation of Cathode A cathode active material lithium cobalt oxide (LiCoO$_2$), a conductive agent (Super P) and a polyvinylidene fluoride (PVDF) were dissolved in a solvent N-methylpyrrolidone (NMP) to prepare a cathode slurry. The solid content in the cathode slurry was 77 wt %, wherein the mass ratio of LiCoO$_2$ to Super P to PVDF was 97.8:1:1.2. A current collector aluminum foil was uniformly coated with the cathode slurry at 90% of the anode capacity. After drying at 85° C., cold pressing was carried out, then trimming, cutting and slitting were carried out, and drying was carried out under vacuum at 85° C. for 4 h to obtain the cathode.

(2) Preparation of Anode

An anode active material graphite, a conductive agent (Super P), a sodium carboxymethyl cellulose (CMC) and a styrene butadiene rubber (SBR) were dissolved in deionized water and uniformly mixed to prepare an anode slurry. The solid content in the anode slurry was 49 wt %, wherein the mass ratio of graphite to Super P to CMC to SBR was 97.7:1:0.3:1. A current collector copper foil was coated with the anode slurry. After drying at 85° C., rolling was carried out, then trimming, cutting and slitting were carried out, drying was carried out under vacuum at 120° C. for 12 h, and finally, compaction was carried out. The sample was taken and weighed such that the compacted density was in accordance with the requirements of the examples and the comparative examples, thereby obtaining the anode.

The compacted density was measured by the following method:

At least 10 cold-pressed anodes were taken, and die-cut at a certain diameter to obtain small disks having the area of Si. The thickness ($h_i$) was measured with a ten thousandths micrometer and the weight ($W_i$) was measured on a scale. The compacted density of each anode was calculated using the following formula:

$$\rho_i = W_i/(S_i \times h_i), i=1,2,3 \ldots n, n \geq 10.$$

The average value of the compacted density of each of the anodes was taken as the compacted density of the anode under such conditions:

$$\rho = (\rho_1 + \rho_2 + \rho_3 + \ldots \rho_n)/n.$$

(3) Preparation of Separator

A 6 μm polyethylene film (PE) was used as the separator.

(4) Preparation of Electrolyte

Ethylene carbonate (EC), propylene carbonate (PC), diethyl carbonate (DEC) and propyl propionate were uniformly mixed at a mass ratio of 20:20:40:20 in a dry argon atmosphere. Based on the total weight of the electrolyte, 0.5% VC and 1% LiBOB were added, dissolved and uniformly mixed. 1.15 mol/L lithium hexafluorophosphate ($LiPF_6$) was dissolved in the mixed solution to obtain an electrolyte A. A cyclic borate, a nitrile compound, a carboxylate and/or a fluorosulfonate were further added to the electrolyte A to prepare electrolytes used in the different examples and comparative examples.

(5) Preparation of Lithium-Ion Battery

The prepared cathode, separator and anode were stacked in order such that the separator was between the cathode and the anode, and then wound to obtain a cell. Tabs were soldered, and the bare cell was placed in an aluminum-plastic film outer package. The electrolyte prepared above was injected into a dried lithium-ion battery. After packaging, standing, forming (charging at a constant current of 0.02 C to 3.3 V, and charging at a constant current of 0.1 C to 3.6 V), shaping and capacity testing, the preparation of the lithium-ion battery (the soft pack battery had the thickness of 3.3 mm, the width of 39 mm and the length of 96 mm) was completed.

2. Performance Test Method for Lithium-Ion Battery

(1) Test Method for Storage Performance

The lithium-ion battery was charged at a constant current of 0.7 C to 4.45 V, and charged at a constant voltage to a current of 0.05 C to a fully charged state. The thickness THK0 of the lithium-ion battery in the fully charged state was tested. The fully charged state cell was stored in a high-temperature furnace at 85° C. for 6 h, and the cell thickness THK1 was tested. The expansion ratio of the lithium-ion battery was calculated according to the following formula:

Expansion ratio=$(THK1-THK0)/THK0$

(2) Test Method for Floating Charge Performance

The lithium-ion battery was placed in a 45° C. incubator, charged at a constant current of 0.7 C to 4.45 V, and charged at a constant voltage to a current of 0.05 C to a fully charged state. The thickness of the lithium-ion battery in the fully charged state was tested. Then, constant voltage charging was continued at 4.45 V, and the thickness of the lithium-ion battery was tested every 2 days. The expansion ratio of the lithium-ion battery was calculated (the calculation formula is the same as above), and the constant voltage charging time when the battery expansion rate was up to 10% was recorded.

(3) Test Method for Rate Performance

The lithium-ion battery was placed in a 25° C. incubator and allowed to stand for 20 minutes to bring the lithium-ion battery to a constant temperature. The battery was discharged at a constant current of 0.5 C to 3 V, charged at a constant current of 0.2 C to 4.45 V and charged at a constant voltage to a current of 0.05 C, and the charge capacity was recorded as CAP0. The battery was discharged at a constant current of 0.5 C to 3.0 V and then charged at a constant current of 2 C to 4.45 V, and the charge capacity was recorded as CAP1. The 2C charging capacity of the lithium-ion battery was calculated according to the following formula:

2C charging capacity=$CAP1/CAP0$

3. Performance of Lithium-Ion Battery

Tables 1-6 show the compositions of the electrolytes used in the lithium-ion batteries of the examples and comparative examples, as well as the test results of the floating charge performance, storage performance and 2C charging capacity of each lithium-ion battery.

Table 1 shows the effect of the cyclic borate on the performance of the lithium-ion battery. As shown in Examples 1-6, the cyclic borate can significantly improve the storage and floating charge performance of the lithium-ion battery as compared with Comparative Example 2. When the cyclic borate is Organic Substance 1, the lithium-ion battery achieves excellent floating charge and storage performance. The content of the cyclic borate may be in a range of about 0.01% to about 3%. When the content of the cyclic borate is about 0.5% to about 1%, the lithium-ion battery achieves excellent floating charge and storage performance.

Table 2 shows the effect of the nitrile compound on the performance of the lithium-ion battery. As shown in Examples 3 and 7-12, the nitrile compound can significantly improve the storage and floating charge performance of the lithium-ion battery as compared with Comparative Example 1. The content of the nitrile compound may be in a range of about 0.05% to about 6%. When the content of the nitrile compound is about 0.5% to about 2%, the lithium-ion battery achieves excellent floating charge and storage performance.

Table 3 shows the effect of the carboxylate on the performance of the lithium-ion battery. As shown in Examples 13-18, the carboxylate can significantly improve the rate performance of the lithium-ion battery as compared with Example 3. The content of the carboxylate may be in a range of about 5% to about 40%. When the content of the carboxylate is about 10% to about 30%, the lithium-ion battery achieves excellent floating charge and storage performance.

Table 4 shows the effect of the fluorosulfonate on the performance of the lithium-ion battery. As shown in Examples 24 and 25, the fluorosulfonate can significantly improve the rate performance of the battery as compared with Example 3. As shown in Examples 19-23, the fluorosulfonate can significantly improve the rate performance of the battery as compared with Example 15. The content of the fluorosulfonate may be in a range of about 0.01% to about 5%. When the content of the fluorosulfonate is about 0.1% to about 1%, the lithium-ion battery achieves excellent floating charge and storage performance.

Table 5 shows the effect of the compacted density of the anode on the performance of the lithium-ion battery. As shown in Examples 26-30, when the compacted density of the anode is not less than 1.75 g/cm$^3$, the lithium-ion battery not only has the basic floating charge and storage performance satisfying the requirements of the present application, but also achieves a significantly improved energy density. When the compacted density of the anode is about 1.78 g/cm$^3$ to about 1.85 g/cm$^3$, the lithium-ion battery achieves excellent floating charge performance, storage performance and energy density.

As shown in Example 27, compared with Examples 31 and 32 and Comparative Example 3, the storage performance of the lithium-ion battery is significantly improved when the carboxylate and the fluorosulfonate are simultaneously added to the electrolyte of the present application.

References throughout the specification to "embodiments", "partial embodiments", "one embodiment", "another example", "examples", "specific examples" or "partial examples" mean that at least one embodiment or example of the present application includes specific features, structures, materials or characteristics described in the embodiments or examples. Therefore, descriptions appearing throughout the specification, such as "in some embodiments", "in embodiments", "in an embodiment", "in another example", "in an example", "in a particular example" or "examples", are not necessarily referring to the same embodiments or examples in the present application. Furthermore, the particular features, structures, materials or characteristics herein may be combined in any suitable manner in one or more embodiments or examples.

Although the illustrative embodiments have been shown and described, it should be understood by those skilled in the art that the above-described embodiments are not to be construed as limiting the present application, and variations, substitutions and modifications may be made to the embodiments without departing from the spirit, principle and scope of the present application.

TABLE 1

Effect of cyclic borate on performance of lithium-ion battery

| No. | Cyclic Borate Organic Substance | wt % | Nitrile Compound Organic Substance | wt % | Compacted Density of Anode | Storage Performance 6 h Expansion Ratio/% | Floating charge Performance Time/d | Charging Capacity 2C/% |
|---|---|---|---|---|---|---|---|---|
| Example 1 | 2 | 1 | 12 | 2 | 1.80 | 14.78 | 32 | 55.73 |
| Example 2 | 3 | 1 | 12 | 2 | 1.80 | 13.47 | 34 | 58.89 |
| Example 3 | 1 | 1 | 12 | 2 | 1.80 | 12.39 | 40 | 53.57 |
| Example 4 | 1 | 0.01 | 12 | 2 | 1.80 | 13.23 | 28 | 69.23 |
| Example 5 | 1 | 0.5 | 12 | 2 | 1.80 | 12.67 | 32 | 61.55 |
| Example 6 | 1 | 2 | 12 | 2 | 1.80 | 10.13 | 42 | 49.39 |

TABLE 2

Effect of nitrile compound on performance of lithium-ion battery

| No. | Cyclic Borate Organic Substance | wt % | Nitrile Compound Organic Substance | wt % | Compacted Density of Anode | Storage Performance 6 h Expansion Ratio/% | Floating charge Performance Time/d | Charging Capacity 2C/% |
|---|---|---|---|---|---|---|---|---|
| Example 7 | 1 | 1 | 12 | 2 | 1.80 | 16.43 | 38 | 53.98 |
| Example 8 | 1 | 1 | 12 | 2 | 1.80 | 14.89 | 38 | 54.25 |
| Example 9 | 1 | 1 | 12 | 0.05 | 1.80 | 25.78 | 32 | 65.23 |
| Example 10 | 1 | 1 | 12 | 0.5 | 1.80 | 19.32 | 34 | 60.14 |
| Example 11 | 1 | 1 | 12 | 1 | 1.80 | 15.41 | 36 | 57.92 |
| Example 3 | 1 | 1 | 12 | 2 | 1.80 | 16.43 | 38 | 53.98 |
| Example 12 | 1 | 1 | 12 | 3 | 1.80 | 14.89 | 38 | 54.25 |

TABLE 3

Effect of carboxylate on performance of lithium-ion battery

| No. | Cyclic Borate Organic Substance | wt % | Nitrile Compound Organic Substance | wt % | Carboxylate Organic Substance | wt % | Compacted Density of Anode | Storage Performance 6 h Expansion Ratio/% | Floating charge Performance Time/d | Charging Capacity 2C/% |
|---|---|---|---|---|---|---|---|---|---|---|
| Example 13 | 1 | 1 | 12 | 2 | 20 | 20 | 1.80 | 13.49 | 38 | 72.45 |
| Example 14 | 1 | 1 | 12 | 2 | 21 | 20 | 1.80 | 13.56 | 38 | 73.24 |

TABLE 3-continued

Effect of carboxylate on performance of lithium-ion battery

| No. | Cyclic Borate Organic Substance | wt % | Nitrile Compound Organic Substance | wt % | Carboxylate Organic Substance | wt % | Compacted Density of Anode | Storage Performance 6 h Expansion Ratio/% | Floating charge Performance Time/d | Charging Capacity 2C/% |
|---|---|---|---|---|---|---|---|---|---|---|
| Example 15 | 1 | 1 | 12 | 2 | 19 | 20 | 1.80 | 12.43 | 38 | 75.98 |
| Example 16 | 1 | 1 | 12 | 2 | 19 | 5 | 1.80 | 10.19 | 40 | 55.45 |
| Example 17 | 1 | 1 | 12 | 2 | 19 | 30 | 1.80 | 19.48 | 36 | 79.67 |
| Example 18 | 1 | 1 | 12 | 2 | 19 | 40 | 1.80 | 28.35 | 32 | 88.49 |

TABLE 4

Effect of fluorosulfonate on performance of lithium-ion battery

| No. | Cyclic Borate Organic Substance | wt % | Nitrile Compound Organic Substance | wt % | Carboxylate Organic Substance | wt % | Fluorosulfonate Organic Substance | wt % | Compacted Density of Anode | Storage Performance 6 h Expansion Ratio/% | Floating charge Performance Time/d | Charging Capacity 2C/% |
|---|---|---|---|---|---|---|---|---|---|---|---|---|
| Example 19 | 1 | 1 | 12 | 2 | 19 | 20 | 23 | 0.5 | 1.80 | 12.49 | 38 | 82.59 |
| Example 20 | 1 | 1 | 12 | 2 | 19 | 20 | 24 | 0.5 | 1.80 | 12.56 | 38 | 84.23 |
| Example 21 | 1 | 1 | 12 | 2 | 19 | 20 | 24 | 0.01 | 1.80 | 12.43 | 38 | 77.75 |
| Example 22 | 1 | 1 | 12 | 2 | 19 | 20 | 24 | 1 | 1.80 | 12.29 | 38 | 81.03 |
| Example 23 | 1 | 1 | 12 | 2 | 19 | 20 | 24 | 2 | 1.80 | 12.18 | 38 | 78.92 |
| Example 24 | 1 | 1 | 12 | 2 | — | — | 23 | 0.5 | 1.80 | 10.35 | 40 | 60.43 |
| Example 25 | 1 | 1 | 12 | 2 | — | — | 24 | 0.5 | 1.80 | 10.35 | 40 | 62.52 |

TABLE 5

Effect of compacted density of anode electrode on performance of lithium-ion battery

| No. | Cyclic Borate Organic Substance | wt % | Nitrile Compound Organic Substance | wt % | Carboxylate Organic Substance | wt % | Fluorosulfonate Organic Substance | wt % | Compacted Density of Anode | Storage Performance 6 h Expansion Ratio/% | Floating charge Performance Time/d | Charging Capacity 2C/% |
|---|---|---|---|---|---|---|---|---|---|---|---|---|
| Example 26 | 1 | 1 | 12 | 2 | 19 | 20 | 24 | 0.5 | 1.75 | 12.39 | 38 | 89.01 |
| Example 27 | 1 | 1 | 12 | 2 | 19 | 20 | 24 | 0.5 | 1.78 | 12.46 | 38 | 86.73 |
| Example 20 | 1 | 1 | 12 | 2 | 19 | 20 | 24 | 0.5 | 1.8 | 12.56 | 38 | 84.23 |
| Example 28 | 1 | 1 | 12 | 2 | 19 | 20 | 24 | 0.5 | 1.83 | 12.16 | 38 | 82.12 |
| Example 29 | 1 | 1 | 12 | 2 | 19 | 20 | 24 | 0.5 | 1.85 | 12.89 | 36 | 80.32 |
| Example 30 | 1 | 1 | 12 | 2 | 19 | 20 | 24 | 0.5 | 1.87 | 13.42 | 34 | 75.21 |
| Example 31 | 1 | 1 | 12 | 2 | 19 | 20 | — | — | 1.78 | 12.37 | 38 | 80.34 |
| Example 32 | 1 | 1 | 12 | 2 | — | — | 24 | 0.5 | 1.78 | 10.56 | 40 | 74.81 |

TABLE 6

Comparative Examples

| No. | Cyclic Borate Organic Substance | wt % | Nitrile Compound Organic Substance | wt % | Carboxylate Organic Substance | wt % | Fluorosulfonate Organic Substance | wt % | Compacted Density of Anode | Storage Performance 6 h Expansion Ratio/% | Floating charge Performance Time/d | Charging Capacity 2C/% |
|---|---|---|---|---|---|---|---|---|---|---|---|---|
| Comparative Example 1 | 1 | 1 | — | — | — | — | — | — | 1.80 | 30.15 | 28 | 68.32 |
| Comparative Example 2 | — | — | 12 | 2 | — | — | — | — | 1.80 | 28.19 | 26 | 69.65 |
| Comparative Example 3 | — | — | — | — | 19 | 20 | 24 | 0.5 | 1.80 | 40.39 | 20 | 47.51 |

What is claimed is:

1. An electrolyte, comprising an organic solvent, an additive and a lithium salt, the additive comprising a cyclic borate and a nitrile compound, wherein the cyclic borate has the following structure:

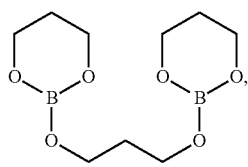 [SMILES: C1COB(OCCCOB2OCCCO2)OC1]

wherein the organic solvent comprises a carboxylate having the following structure:

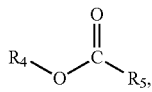

wherein $R_4$ and $R_5$ are each independently an alkyl group having 1-5 carbon atoms, and wherein the carboxylate has a content of 10%-30%, wherein the additive further comprises a fluorosulfonate, based on a total weight of the electrolyte, a content of the fluorosulfonate being about 0.01% to about 5%.

2. The electrolyte of claim 1, wherein based on the total weight of the electrolyte, a content of the nitrile compound is about 0.05% to about 6%, and a content of the cyclic borate is about 0.01% to about 3%.

3. The electrolyte of claim 1, wherein the nitrile compound has the following structure:

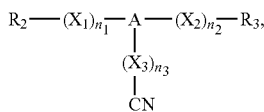

wherein:
- A is selected from a chain alkyl group having 1-6 carbon atoms, a cycloalkyl group having 3-12 carbon atoms, an alkylene group having 2-6 carbon atoms or a cyclic alkylene group having 6-12 carbon atoms;
- $R_2$ and $R_3$ are each independently selected from a hydrogen atom, a cyano group, a nitrile group having 1-5 carbon atoms or an alkyl group having 1-8 carbon atoms;
- $X_1$, $X_2$ and $X_3$ are each independently selected from —$CH_2$—, —O—, —$OCH_2$—, —$OCH_2CH_2CH_2$—, —$OCH_2CH_2$—, —CHF— or —$CF_2$—; and
- $n_1$, $n_2$ and $n_3$ are each independently an integer selected from 0-10.

4. The electrolyte of claim 1, wherein the nitrile compound is at least one selected from the group consisting of:

Organic Substance 12

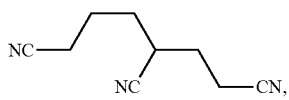

Organic Substance 13

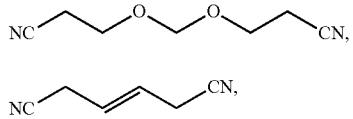

Organic Substance 14

Organic Substance 15

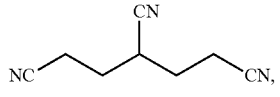

Organic Substance 16

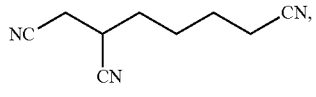

Organic Substance 17

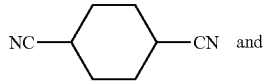

Organic Substance 18

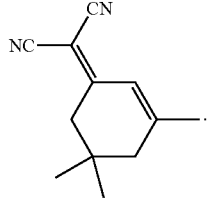

5. The electrolyte of claim 1, wherein the fluorosulfonate has the following structure:

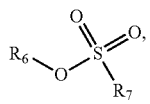

wherein:
- $R_6$ and $R_7$ are each independently selected from an alkyl group having 2-20 carbon atoms, a fluoroalkyl group having 2-20 carbon atoms, an alkoxy group having 2-10 carbon atoms, a fluoroalkoxy group having 2-10 carbon atoms, an alkenyl group having 2-20 carbon atoms or a fluoroalkenyl group having 2-20 carbon atoms.

6. The electrolyte of claim 1, wherein the fluorosulfonate is at least one selected from the group consisting of:

Organic Substance 23

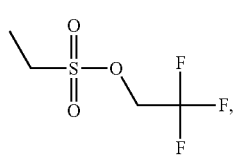

Organic Substance 24

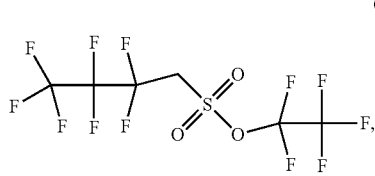

Organic Substance 25

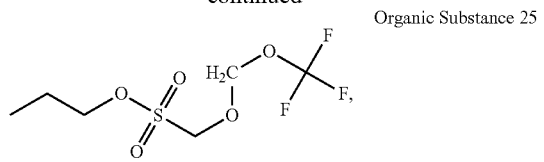

Organic Substance 26

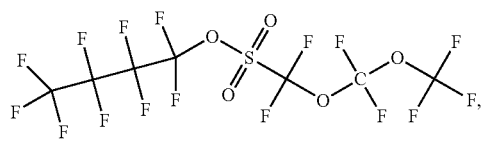

Organic Substance 27

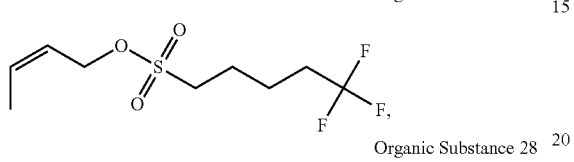

Organic Substance 28

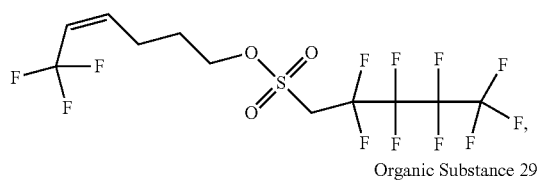

Organic Substance 29

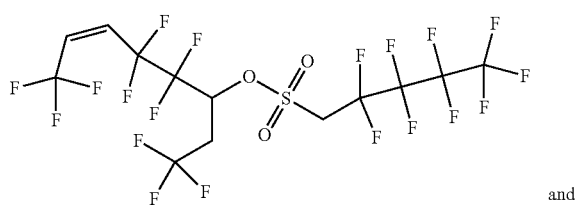

and

Organic Substance 30

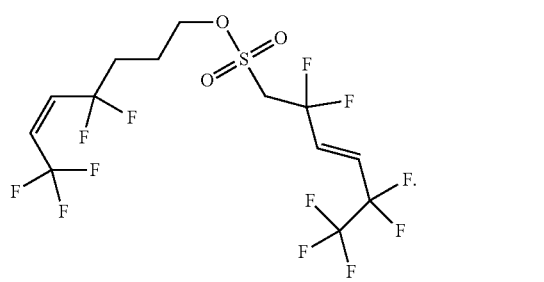

7. The electrolyte of claim 1, wherein the additive further comprising at least one other film-forming additive selected from the group consisting of fluoroethylene carbonate, vinylene carbonate, 1,3-propane sultone, 1,3,2-Dioxathiolane 2,2-dioxide, methylene methanedisulfonate and lithium bis(oxalate)borate.

8. An electrochemical device, comprising:
a cathode;
an anode;
a separator; and
an electrolyte,
wherein the anode has a compacted density of not less than about 1.75 g/cm³, and
wherein the electrolyte comprises an organic solvent, an additive and a lithium salt, the additive comprising a cyclic borate and a nitrile compound, wherein the cyclic borate has the following structure:

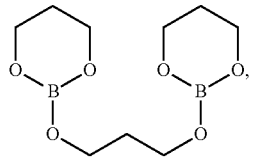 [SMILES: C1COB(OCCCOB2OCCCO2)OC1]

wherein the organic solvent comprises a carboxylate having the following structure:

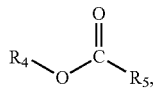

wherein $R_4$ and $R_5$ are each independently an alkyl group having 1-5 carbon atoms, and
wherein the carboxylate has a content of 10%-30%,
wherein the additive further comprises a fluorosulfonate, based on a total weight of the electrolyte, a content of the fluorosulfonate being about 0.01% to about 5%.

9. The electrochemical device of claim 8, wherein the nitrile compound has the following structure:

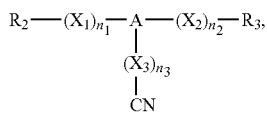

wherein:
A is selected from a chain alkyl group having 1-6 carbon atoms, a cycloalkyl group having 3-12 carbon atoms, an alkylene group having 2-6 carbon atoms or a cyclic alkylene group having 6-12 carbon atoms;
$R_2$ and $R_3$ are each independently selected from a hydrogen atom, a cyano group, a nitrile group having 1-5 carbon atoms or an alkyl group having 1-8 carbon atoms;
$X_1$, $X_2$ and $X_3$ are each independently selected from —$CH_2$—, —O—, —$OCH_2$—, —$OCH_2CH_2CH_2$—, —$OCH_2CH_2$—, —CHF— or —$CF_2$—; and
$n_1$, $n_2$ and $n_3$ are each independently an integer selected from 0-10.

10. The electrochemical device of claim 8, wherein the nitrile compound is at least one selected from the group consisting of:

Organic Substance 12

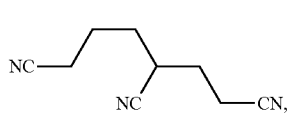

Organic Substance 13

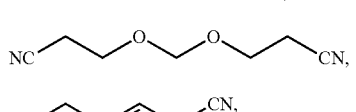

Organic Substance 14

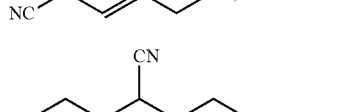

Organic Substance 15

Organic Substance 16

Organic Substance 17

Organic Substance 18

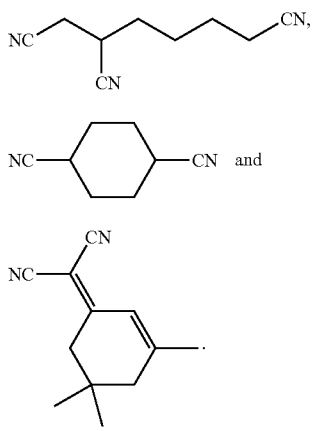

Organic Substance 25

Organic Substance 26

Organic Substance 27

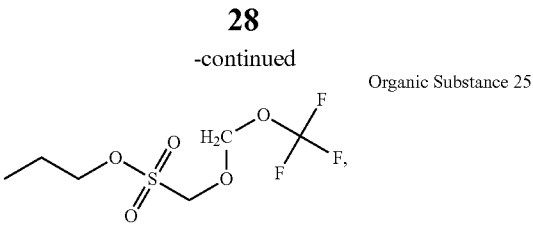

Organic Substance 28

Organic Substance 29

Organic Substance 30

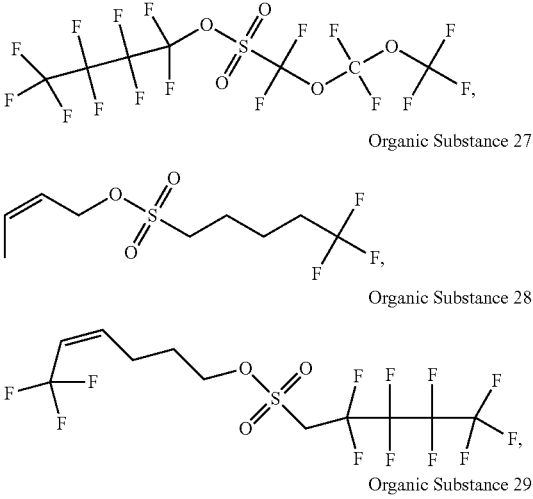

11. The electrochemical device of claim 8, wherein the fluorosulfonate has the following structure:

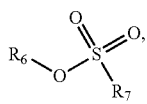

wherein:

R$_6$ and R$_7$ are each independently selected from an alkyl group having 2-20 carbon atoms, a fluoroalkyl group having 2-20 carbon atoms, an alkoxy group having 2-10 carbon atoms, a fluoroalkoxy group having 2-10 carbon atoms, an alkenyl group having 2-20 carbon atoms or a fluoroalkenyl group having 2-20 carbon atoms.

12. The electrochemical device of claim 11, wherein the fluorosulfonate is at least one selected from the group consisting of:

Organic Substance 23

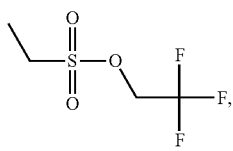

Organic Substance 24

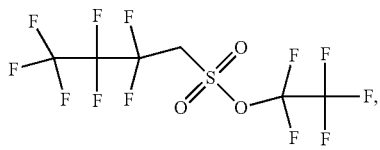

13. The electrochemical device of claim 8, wherein the additive further comprising at least one other film-forming additive selected from the group consisting of fluoroethylene carbonate, vinylene carbonate, 1,3-propane sultone, 1,3,2-Dioxathiolane 2,2-dioxide, methylene methanedisulfonate and lithium bis(oxalate)borate.

14. An electronic device, comprising the electrochemical device of claim 8.

* * * * *